United States Patent
Baumann et al.

(10) Patent No.: US 6,656,997 B2
(45) Date of Patent: *Dec. 2, 2003

(54) PRODUCT WITH ANTISTATIC PROPERTIES

(75) Inventors: Franz-Erich Baumann, Duelmen (DE); Reinhard Beuth, Marl (DE); Josef Kübber, Geldern (DE); Michael Schlobohm, Haltern (DE)

(73) Assignee: Degussa AG, Duesseldorf (DE)

( * ) Notice: Subject to any disclaimer, the term of this patent is extended or adjusted under 35 U.S.C. 154(b) by 92 days.

This patent is subject to a terminal disclaimer.

(21) Appl. No.: 09/962,581

(22) Filed: Sep. 26, 2001

(65) Prior Publication Data

US 2002/0037955 A1 Mar. 28, 2002

Related U.S. Application Data

(63) Continuation of application No. 09/441,137, filed on Nov. 17, 1999, now Pat. No. 6,316,537.

(30) Foreign Application Priority Data

Nov. 27, 1998 (DE) .......................................... 198 54 819

(51) Int. Cl.⁷ ................................................. C08K 3/04
(52) U.S. Cl. ....................................... 524/496; 524/495
(58) Field of Search .................................. 524/496, 495

(56) References Cited

U.S. PATENT DOCUMENTS

| | | | | | |
|---|---|---|---|---|---|
| 4,629,646 A | * | 12/1986 | Ide et al. | .................... | 428/143 |
| 4,828,755 A | * | 5/1989 | Kusumgar et al. | .......... | 252/511 |
| 4,851,288 A | * | 7/1989 | Ishikuro et al. | ............. | 428/329 |
| 5,084,504 A | * | 1/1992 | Sano et al. | ................. | 524/496 |
| 5,179,155 A | * | 1/1993 | Sano et al. | ................. | 524/496 |
| 6,011,090 A | * | 1/2000 | Sakogawa et al. | .......... | 523/438 |
| 6,025,429 A | * | 2/2000 | Yamazaki et al. | .......... | 524/495 |
| 6,087,434 A | * | 7/2000 | Hisashi et al. | .............. | 524/495 |
| 6,316,537 B1 | * | 11/2001 | Baumann et al. | ........... | 524/496 |
| 6,469,092 B1 | | 10/2002 | Stoeppelmann et al. | | |
| 6,506,830 B1 | | 1/2003 | Bussi et al. | | |

* cited by examiner

Primary Examiner—Edward J. Cain
Assistant Examiner—Katarzyna I Wyrozebski Lee
(74) Attorney, Agent, or Firm—Oblon, Spivak, McClelland, Maier & Neustadt, P.C.

(57) ABSTRACT

A product made from plastic and composed, at least in part, of a thermoplastic molding composition which comprises polyamide and comprises from 3 to 30% by weight of a conductivity black, where the conductivity black is defined by the following parameters:

a) DBP absorption of from 100 to 300 ml/100 g;

b) a specific surface area of from 30 to 180 $m^2/g$;

c) an ash content of less than 0.1% by weight and d) a grit content of not more than 25 ppm, has improved heat-ageing resistance, and also improved resistance to peroxide-containing motor fuels.

18 Claims, No Drawings

PRODUCT WITH ANTISTATIC PROPERTIES

This application is a continuation of application Ser. No. 09/441,137 filed Nov. 17, 1999 now U.S. Pat. No. 6,316,537.

BACKGROUND OF THE INVENTION

1. Field of the Invention

The present invention relates to a product provided with antistatic properties.

2. Description of the Background

Appropriate thermoplastics are increasingly replacing metal as a material in piping systems which transport combustible fluids, e.g. motor fuel piping systems for vehicles or aircraft, or supply piping in gas stations. This results in savings in weight and in production costs, but in turn gives rise to the disadvantage that electrostatic charges can arise.

Under certain conditions the electrostatic charge created by the flow of motor fuel or solvent can discharge extremely rapidly and produce holes in the pipeline wall, through which the motor fuel or, respectively, the solvent can escape. On contact with hot components in the vicinity, or if sparks are generated, motor fuel or solvent can ignite and cause a fire in the vehicle or installation. In partly filled tanks where the motor fuel can move around freely, the electrical charge can also cause explosion of ignitable mixtures within these.

It is known that this problem can be avoided by providing the components of the piping system with antistatic properties. For example, DE 40 25 301 C1 describes antistatic motor fuel piping for motor vehicles which is composed of at least two different layers of polymer. At least one of the layers has been modified with electrically conducting additives, such as conductivity black. Although the motor fuel piping is described in that text as peroxide-resistant, it has become apparent that this applies only to layers which do not comprise the carbon black. The test conditions used take no account of the damage to the relatively thin layer provided with antistatic properties.

It has now also been found that the conductivity blacks used hitherto have a disadvantageous catalytic action. Pipes provided with these and having two or more layers show serious deterioration in low-temperature impact strength even after a relatively short time on storage in peroxide-containing motor fuels (sour gas), e.g. to the Ford specification FLTM AZ 105-01, PN180 or the GM specification GM213M, PN50. Another problem which has been found is that the ageing of pipes of this type having two or more layers is markedly more rapid on exposure to heat, e.g. in the engine compartment, with attendant embrittlement.

EP-A-0 730 115 is based upon the recognition that the resistance to peroxide-containing motor fuels of pipes having two or more layers and provided with antistatic properties is improved by using no conductivity black, and using graphite fibrils in its place. However, in practice this improvement is insufficient in many cases. In addition, ageing on exposure to heat continues here to be at a level inappropriately high for practical purposes. A further factor is that graphite fibrils are very expensive.

EP-A-0 745 763 describes a motor fuel filter made from plastic. Its casing is composed of at least three layers, and the inner and the outer layer are composed of a plastic provided with conductive properties. Electrically conducting additives mentioned are, inter alia, conductivity black and graphite fibrils. This motor fuel filter suffers from the disadvantages discussed above.

The object was therefore to produce products provided with antistatic properties and having both high resistance to peroxide-containing motor fuels or solvents and low susceptibility to heat-ageing.

SUMMARY OF THE INVENTION.

This object was achieved by means of a product made from plastic and composed, at least in part, of a thermoplastic molding composition which comprises polyamide and comprises from 3 to 30% by weight, preferably from 10 to 25% by weight and particularly preferably from 16 to 20% by weight, of a conductivity black, wherein the conductivity black is defined by the following parameters:

a) Dibutyl phthalate (DBP) absorption to ASTM D2414 of from 100 to 300 ml/100 g, preferably from 140 to 270 ml/100 g;

b) a specific surface area, measured via nitrogen absorption to ASTM D3037, of from 30 to 180 $m^2/g$, preferably from 40 to 140 $m^2/g$;

c) an ash content to ASTM D1506 of less than 0.1% by weight, preferably below 0.06% by weight, particularly preferably below 0.04% by weight, and d) a grit content of not more than 25 ppm, preferably not more than 15 ppm and particularly preferably not more than 10 ppm.

For the purposes of the present invention, grit is hard coke-like particles which arise as a result of cracking reactions in the preparation process.

DETAILED DESCRIPTION OF THE INVENTION

Two embodiments of this invention are possible:

1. The product made from plastic is entirely composed of this molding composition, i.e. it has a one-layer structure.

2. The product made from plastic is composed of at least two layers, where at least one layer is composed of the molding composition used according to the invention and the other layers are composed of another molding composition which has not been rendered antistatic. For example, the article is composed of 2, 3, 4, 5, 6 or even more layers. If the product made from plastic is hollow, the anti-static layer may be an outer layer or have its location in the middle. However, it is usefully the innermost layer.

In the case of a hollow product made from plastic, e.g. a pipe, the antistatic layer may also preferably cover the entire extent of the hollow article. However, it may also cover just a relatively small part of this extent, and so may be executed in the form of a straight or spiral band.

A function of the non-antistatic layers is to give the product the required functional properties, such as strength, impact strength, flexibility or barrier action with respect to motor fuel components. Except in specialized designs, the individual layers here should adhere firmly to one another, and this can be brought about using an adhesion promoter if the layers are not mutually compatible.

Suitable materials and configurations of layers for systems conveying motor fuels can be found, for example, in DE-A 40 25 301, 41 12 662, 41 12 668, 41 37 430, 41 37 431, 41 37 434, 42 07 125, 42 14 383, 42 15 608, 42 15 609, 42 40 658, 43 02 628, 43 10 884, 43 26 130, 43 36 289, 43 36 290, 43 36 291, 44 10 148, 44 18 006, 195 07 026, 196 41 946, and also WO-A-93/21466, WO-A-93/25835, WO-A-94/09302, WO-A-94/09303, WO-A-95/27866, WO-A-95/30105, EP-A-0 198 728, EP-A-0 558 373 and EP-A-0 730 115. In the case of the hollow profiles or hollow articles disclosed in these texts, one of the layers may have been provided according to the invention with anti-static properties, or an additional antistatic layer is added.

The molding composition provided with antistatic properties may comprise at least 10% by weight, preferably at least 40% by weight and particularly preferably at least 70% by weight, of any desired polyamide. The other layers are composed, for example, of a polyamide molding composition, of a polyolefin molding composition, or of a rubber, or, in the case of a barrier layer for motor fuel constituents or solvents as in the prior art of a molding composition based on thermoplastic polyester, polyvinylidene fluoride (PVDF), ETFE or THV, or of polyolefins, or ethylenevinyl alcohol copolymer (EVOH). For suitable embodiments reference should be made to the abovementioned patent applications.

Possible polyamides here are primarily aliphatic homo- and copolyamides. Examples which may be mentioned are nylon-4,6, -6,6, -6,12, -8,10 and -10,10 and the like. Preference is given to nylon-6, -10,12, -11, -12 and -12,12. [The polyamides are identified as in the international standard, where the first number(s) give(s) the number of carbon atoms in the starting diamine and the final number(s) give(s) the number of carbon atoms in the dicarboxylic acid. If only one number is given, this means that the starting material was an α, ω-aminocarboxylic acid or the lactam derived therefrom—H. Domininghaus, Die Kunststoffe und ihre Eigenschaften [Plastics and their Properties], page 272, VDI-Verlag (1976)].

If copolyamides are used these may contain, for example, adipic acid, sebacic acid, suberic acid, isophthalic acid or terephthalic acid as coacid and, respectively, bis(4-aminocyclohexyl)methane, trimethylhexamethylenediamine or hexamethylenediamine or the like as codiamine.

The preparation of these polyamides is known (e.g.: D. B. Jacobs, J. Zimmermann, Polymerization Processes, pp. 424–467; Interscience Publishers, New York (1977); DE-B 21 52 194).

Other suitable polyamides are mixed aliphatic/aromatic polycondensates, as described, for example, in U.S. Pat. Nos. 2,071,250, 2,071,251, 2,130,523, 2,130,948, 2,241, 322, 2,312,966, 2,512,606 or 3,393,210 or in Kirk-Othmer, Encyclopedia of Chemical Technology, 3rd ed., Vol. 18, Wiley & Sons (1982), pp. 328 and 435. Other polycondensates suitable as polyamides are poly(etheresteramides) and, respectively, poly(etheramides). Products of this type are described, for example, in DE-A 27 12 987, 25 23 991 and 30 06 961.

The molecular weight (number-average) of the polyamides is above 4000, preferably above 10,000. The relative viscosity ($\eta_{rel}$) here is preferably in the range from 1.65 to 2.4 (measured to ISO 307/DIN 53 727).

If required, the polyamides may be rendered impact-resistant. Examples of suitable modifiers are ethylene-propylene copolymers or ethylene-propylene-diene copolymers (EP-A-0 295 076), acrylate-nitrile rubber, polypentenylene, polyoctenylene, or copolymers of random or block structure made from alkenylaromatic compounds with aliphatic olefins or dienes (EP-A-0 261 748). Other impact-modifying rubbers which may be used are core-shell rubbers with an elastomeric core made from (meth)acrylate rubber, from butadiene rubber or from styrene-butadiene rubber with, in each case, a glass transition temperature $T_g<-10°$ C. The core may have been crosslinked. The shell may be composed of styrene and/or methyl methacrylate and/or of other unsaturated monomers (DE-A 21 44 528 or 37 28 685). The proportion of impact-modifying component should be selected in such a way as not to impair the desired properties.

The polyamides mentioned are used alone or in mixtures. The molding compositions may also—apart from the abovementioned impact-resistance components—comprise other blend components, e.g. polyolefins, polyesters or, respectively, polyether block amides (PEBA). They may in addition comprise the usual additives, such as processing aids, mold-release agents, stabilizers, flame retardants, reinforcing agents, e.g. glass fibers or carbon fibers, or mineral fillers, e.g. mica or kaolin, or plasticizers.

In a preferred embodiment, the molding composition according to the claims also comprises from 0.1 to 20% by weight of carbon fibers, based on the total weight. However, a content of not more than 16% by weight, in particular not more than 12% by weight, is generally sufficient. Since the carbon fibers themselves contribute to the electrical conductivity, the amount of carbon black used in this case is preferably from 5 to 18% by weight.

Carbon fibers are available commercially and are described, for example, in Römpp Chemie Lexikon [Römpp's Chemical Encyclopedia], 9th edition, pp. 2289 et seq., Thieme, Stuttgart, 1993, and also in the literature mentioned therein.

It must, however, be taken into account that carbon fibers markedly increase stiffness. In many cases, e.g. for quick connectors, this can be desirable, but in other cases, e.g. for motor fuel piping, it is acceptable only to a prescribed degree.

Possible polyolefins are homopolymers and copolymers of α-olefins having from 2 to 12 carbon atoms, for example those of ethylene, propene, 1-butene, 1-hexene or 1-octene. Copolymers and terpolymers which, in addition to these monomers, contain other monomers, in particular dienes such as ethylidenenorbornene, cyclopentadiene or butadiene, are also suitable.

Preferred polyolefins are polyethylene and polypropylene. In principle, any commercially available grade of these may be used, for example: high-, medium- or low-density linear polyethylene, LDPE, ethylene copolymers with relatively small amounts (up to not more than about 40% by weight) of comonomers, such as n-butyl acrylate, methyl methacrylate, maleic anhydride, styrene, vinyl alcohol, acrylic acid or glycidyl methacrylate or the like, isotactic or atactic homopolypropylene, random copolymers of propene with ethene and/or 1-butene, ethylene-propylene block copolymers and others of this type. Polyolefins of this type may also comprise an impact-resistance component, e.g. EPM, or EPDM rubber or SEBS. They may also, as in the prior art, contain functional monomers, such as maleic anhydride, acrylic acid or vinyltrimethoxysilane grafts.

The thermoplastic polyesters have the following fundamental structure:

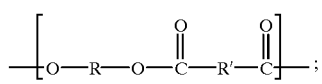

where R is a bivalent, branched or unbranched, aliphatic and/or cycloaliphatic radical having from 2 to 12 carbon atoms, preferably from 2 to 8 carbon atoms, in the carbon chain, and R' is a bivalent aromatic radical having from 6 to 20 carbon atoms, preferably from 8 to 12 carbon atoms, in the carbon backbone.

Examples of the dials to be used in the preparation are ethylene glycol, trimethylene glycol, tetramethylene glycol, hexamethylene glycol, neopentyl glycol, cyclohexanedimethanol and the like.

Up to 25 mol % of the dial mentioned may have been replaced by a diol of the following general formula

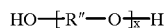

where R" is a bivalent radical having from 2 to 4 carbon atoms and x may be from 2 to 50.

Preferred dials are ethylene glycol and tetramethylene glycol.

Examples of aromatic dicarboxylic acids to be used in the preparation are terephthalic acid, isophthalic acid, 1,4-, 1,5-, 2,6- and 2,7-naphthalenedicarboxylic acid, diphenic acid, diphenyl ether 4,4'-dicarboxylic acid and the polyester-forming derivatives of these, e.g. dimethyl esters.

Up to 20 mol % of these dicarboxylic acids may have been replaced by aliphatic dicarboxylic acids, e.g. succinic acid, maleic acid, fumaric acid, sebacic acid or dodecanedioic acid, inter alia.

The preparation of the thermoplastic polyesters is prior art (DE-A 24 07 155, 24 07 156; Ullmanns Encyclopädie der technischen Chemie [Ullmann's Encyclopedia of Industrial Chemistry], 4th edition, Vol. 19, pp. 65 et seq., Verlag Chemie GmbH, Weinheim 1980).

The polyesters used according to the invention have a viscosity number (J value) in the range from 80 to 240 cm$^3$/g.

Preferred thermoplastic polyesters are polyethylene terephthalate, polybutylene terephthalate, polyethylene 2,6-naphthalate and polybutylene 2,6-naphthalate.

If required, the polyesters may be rendered impact-resistant.

Examples of suitable fluoropolymers are ethylene-tetrafluoroethylene copolymers (ETFE; e.g. Tefzel 200 from DuPont or Hostaflon ET 6235 from Hoechst), tetrafluoroethylene-hexafluoropropene-vinylidene fluoride terpolymers (THV; e.g. Hostaflon TFB from Hoechst), ethylene-chlorotrifluoroethylene copolymers (ECTFE; e.g. Halar from Ausimont) or polyvinylidene fluoride (PVDF). These polymers may comprise plasticizers. However, the use of plasticizer-free fluoropolymers is preferred.

ETFE, THV and ECTFE are described, for example, in H. Dominighaus, Die Kunststoffe und ihre Eigenschaften [Plastics and their Properties], 4th edition, chapter 2.1.7 (Fluor-Kunststoffe [Fluoroplastics]).

The preparation and structure of polyvinylidene fluoride are also known (Hans R. Kricheldorf, Handbook of Polymer Synthesis, Part A, Marcel Dekker Inc. New York—Basel—Hong Kong, pp. 191 et seq.; Kunststoff-Handbuch [Plastics Handbook], 1st edition, Vol. XI, Carl Hanser Verlag Munich (1971), pp. 403 et seq.).

It is also possible for polymers to be present which are based on polyvinylidene fluoride and have up to 40% by weight of other monomers. Examples which may be mentioned of additional monomers of this type are: trifluoroethylene, ethylene, propene and hexafluoropropene.

The polvinylidene fluoride used generally has a melt flow rate of <17 g/10 min, preferably from 2 to 13 g/10 min (DIN 53 735), measured at 230° C. with a load of 5 kg.

For the purposes of the present invention, EVOH is a hydrolyzed ethylene-vinyl acetate copolymer. The hydrolyzed form is then an ethylene-vinyl alcohol copolymer.

The conductivity black used according to the invention is a specific grade which differs from conventional conductivity blacks in the parameters of a) dibutyl phthalate (DBP) absorption to ASTM D2414, b) specific surface area, measured via nitrogen absorption to ASTM D3037, c) ash content to ASTM D1506, and d) grit content. A typical commercially available extra conductive black (EC black) has, for example, a DBP absorption of 350 ml/100 g, a specific N2 surface area of 1000 m$^2$/g and an ash content of 0.7% by weight. The reason for the different behavior in relation to resistance to peroxide-containing motor fuels, and also heat-ageing, is not known. However, it is likely that the difference in behavior is connected to the differences in surface structure and the resultant differences in catalytic activity, and moreover that the ash content of the carbon black also has a catalytic effect.

The carbon blacks used according to the invention may be obtained, for example, by the MMM process. The MMM process is based on the partial combustion of oil (N. Probst, H. Smet, Kautschuk Gummi Kunststoffe [Rubbers and Plastics], 7–8/95, pp. 509–511; N. Probst, H. Smet, GAK 11/96 (Year 49), pp. 900–905). Corresponding products are commercially available.

In one embodiment, the novel product has been shaped in such a way that a gaseous, liquid or disperse medium can be passed through the same or stored in the same. The product is preferably a component of a system conveying solvent or motor fuel, for example in the motor vehicle sector, in aircraft construction or in the petrochemical industry. Examples which should be mentioned are gas station supply piping, filling nozzles, motor fuel tanks, piping for gas-removal systems, motor fuel piping, quick connectors, motor fuel filter casings, canisters for supplementary supplies, piping for brake fluids, for coolants or for hydraulic fluids, and piping for conveying combustible powders or dusts.

The novel product is produced by conventional plastics processing methods, for example, depending on its design, by injection molding (quick connectors), extrusion (single-layer pipe), coextrusion (pipe having two or more layers) or blow molding (motor fuel tank). The skilled worker is familiar with these methods, and there is therefore no need for a further description of them here.

If the mode of construction has two or more layers, the thickness of the layer rendered antistatic is selected in such a way that, on the one hand, any electrical potential generated can be reliably dissipated but, on the other hand, as little material as possible is needed, for reasons of cost. The thickness of the antistatic layer here may be very low, for example from 0.01 to 0.1 mm. However, thicknesses of from 0.2 to 0.3 mm can also be advantageous for particular applications. The ratio of the thickness of the antistatic layer to the total of the thicknesses of the other layers is generally from 1:5 to 1:100.

The novel products have good heat-ageing resistance and also good sour-gas resistance and fulfill, for example, the requirements of the Ford specification WSL-M98D28-A with respect to motor fuel in accordance with Ford FLTM AZ 105-01 or, respectively, PN180, and also the GM specification GM213M with respect to PN50.

They moreover effectively prevent the build-up of high voltages and fulfill, for example, the GM specification GM213M (April 1993 draft), point 4.19. Their surface resistivity is preferably less than $10^5 \Omega$/sq. This continues to hold true after repeated buckling and after storage in the motor fuel.

A more detailed description of some exemplary embodiments is given below:

Single-layer quick connector made from a molding composition which is composed of 63% by weight of nylon-12, 16% by weight of conductivity black according to the present invention (e.g. Ensaco 250 from MM Carbon, Brussels), 23% by weight of glass fibers and 5% by weight of impact modifier (such as EPDM rubber functionalized with maleic anhydride).

Three-layer pipe composed of
  a) an outer layer made from a polyamide molding composition,
  b) attached thereto, a barrier layer as given in EP-A-0 673 762, made from a mixture of from 97.5 to 50% by weight of a vinylidene fluoride polymer and from 2.5 to 50% by weight of polymethacrylimide, and
  c) an antistatic inner layer according to the present invention.

Two-layer pipe composed of
  a) a polyamide molding composition, if desired impact-modified, (for example from 70 to 99% by weight of nylon-11 and from 1 to 30% by weight of EPM rubber functionalized with maleic anhydride), and
  b) an antistatic inner layer according to the present invention.

Four-layer pipe composed of
  a) a polyamide molding composition,
  b) a barrier layer as given in EP-A-0 673 762,
  c) a polyamide molding composition, and
  d) an antistatic inner layer according to the present invention.

Four-layer pipe composed of
  a) a polyamide molding composition,
  b) a barrier layer as given in EP-A-0 569 681 (from 60 to 99% by weight of a semicrystalline thermoplastic polyester, such as polybutylene terephthalate, and from 1 to 40% by weight of a compound having at least two isocyanate groups),
  c) a polyamide molding composition, and
  d) an antistatic inner layer according to the present invention.

The invention also provides molding compositions which comprise polyamide and comprise from 3 to 30% by weight, preferably from 10 to 25% by weight and particularly preferably from 16 to 20% by weight, of a conductivity black having the following parameters: a) DBP absorption of from 100 to 300 ml/100 g; b) a specific surface area of from 30 to 180 m$^2$/g; c) an ash content of less than 0.1% by weight and d) a grit content of not more than 25 ppm. When compared with corresponding molding compositions which comprise a conventional conductivity black or graphite fibrils, molding compositions of this type have better ageing resistance when exposed to heat and/or oxidizing conditions.

The following examples compare the resistance of the novel molding compositions to peroxide-containing motor fuel with that of molding compositions prepared using a conventional conductivity black.

Components Used

VESTAMID L 1801 nf, an uncolored nylon-12 from Degussa-Hüls AG
PRINTEX L, a conductivity black not according to the present invention
ENSACO 250, a conductivity black according to the present invention
NAUGARD 445, a stabilizer
IRGANOX MD 1024, a stabilizer
HOECHST WACHS OP, a processing aid
EXXELOR VA 1801, a maleic-anhydride-modified ethylene-propylene rubber
EXXELOR VA 1803, a maleic-anhydride-modified ethylene-propylene rubber The individual molding compositions were prepared in a usual manner by mixing the melts of the respective components, extruding and pelletizing. The amounts given in the table are parts by weight.

Tensile specimens according to DIN EN ISO 527/1A were produced from the molding compositions by injection molding.

As a control test, these tensile specimens were subjected to a tensile test according to DIN ISO 527 without pretreatment.

The conditions for the treatment of the tensile specimens with peroxide-containing motor fuel were as follows:

| Storage conditions: | full contract |
|---|---|
| Test motor fuel: | FORD (AZ 105-01) PN 90 |
| Peroxide content: | 90 mmol of O$_2$l |
| Temperature: | 60° C. |
| Motor fuel changed: | weekly |

The tensile test according to DIN ISO 527 followed, carried out on test specimens moist with motor fuel. The damage to the matrix of the plastic is illustrated in the table below by means of the elongation $\epsilon_S$ and the elongation at break $\epsilon_R$. The fall-off with time of both elongation values is significantly slower in the case of the novel molding compositions.

| | Comparative Example 1 | Example 1 | Comparative Example 2 | Example 2 | Comparative Example 3 | Example 3 |
|---|---|---|---|---|---|---|
| NYLON-12 | 100 | 100 | 100 | 100 | 100 | 100 |
| PRINTEX L | 28 | | 28 | | 28 | |
| ENSACO 250 | | 28 | | 28 | | 28 |
| NAUGARD 445 | | | 0.5 | 0.5 | 0.5 | 0.5 |
| IRGANOX MD 1024 | | | 0.5 | 0.5 | 0.5 | 0.5 |
| HOECHST WACHS OP | | | 0.5 | 0.5 | 0.5 | 0.5 |
| EXXELOR VA 1801 | | | 22.5 | 22.5 | | |
| EXXELOR VA 1803 | | | | | 22.5 | 22.5 |

| Storage | [%] | | | | | | | | | | | |
|---|---|---|---|---|---|---|---|---|---|---|---|---|
| [days] | $\epsilon_S$ | $\epsilon_R$ | $\epsilon_S$ | $\epsilon_R$ | $\epsilon_S$ | $\epsilon_R$ | $\epsilon_S$ | $\epsilon_R$ | $\epsilon_S$ | $\epsilon_R$ | $\epsilon_S$ | $\epsilon_R$ |
| 0 | 10.1 | 9 | 0.0 | 5 | 5.9 | 32 | 7.4 | 24 | 4.8 | 24 | 6.1 | 22 |
| 3 | 24.7 | 151 | 30.2 | 112 | 114.8 | 115 | 57.6 | 87 | 56.1 | 92 | 61.4 | 80 |

-continued

| | | | | | | | | | | | | |
|---|---|---|---|---|---|---|---|---|---|---|---|---|
| 14 | 22.0 | 89 | 25.6 | 51 | 64.3 | 74 | 45.5 | 84 | 45.4 | 59 | 66.9 | 73 |
| 21 | 20.3 | 36 | 25.0 | 56 | 38.2 | 52 | 42.4 | 72 | 29.9 | 45 | 48.1 | 67 |
| 28 | 19.3 | 23.7 | 23.4 | 45.4 | 32.9 | 40 | 44.9 | 74 | 25.1 | 27 | 43.5 | 60 |

What is claimed is:

1. A plastic product formed of at least two layers, where at least one layer is made from a thermoplastic polyamide containing composition and contains from 3 to 30% by weight of a conductivity black, wherein the conductivity black is defined by the following parameters:
   a) DBP absorption of from 100 to 300 ml/100 g;
   b) a specific surface area of from 30 to 180 m$^2$/g;
   c) an ash content of less than 0.1% by weight and
   d) a grit content of not more than 25 ppm,
wherein at least one other layer is formed of a rubber, a polyethylene-2,6-naphthalate composition, a polybutylene-2,6-naphthalate composition, a polyvinylidenefluoride composition, an ethylene-tetrafluoroethylene copolymer composition, a tetrafluoroethylene-hexafluoropropene-vinylidenefluoride terpolymer composition, a polyolefin composition or an ethylene-vinyl alcohol copolymer composition.

2. The product as claimed in claim 1, wherein the polyamide containing composition contains from 10 to 25% by weight of conductivity block.

3. The product as claimed in claim 2, wherein the conductivity black is present in an amount of from 16 to 20% by weight.

4. The product as claimed in claim 1, wherein the polyamide containing composition comprises from 0.1 to 20% by weight of carbon fibers.

5. The product as claimed in claim 1, wherein the product is a component of a system transporting solvents or motor fuels.

6. A polyamide containing composition, which comprises:
   I. polyamide and from 3 to 30% by weight of a conductivity black, and
   II. from 0.1 to 20% by weight of carbon fibers,
wherein the conductivity black is defined by the following parameters:
   a) DBP absorption of from 100 to 300 ml/100 g;
   b) a specific surface area of from 30 to 180 m$^2$/g;
   c) an ash content of less than 0.1% by weight and
   d) a grit content of not more than 25 ppm.

7. The composition as claimed in claim 6, wherein the conductivity black is present in an amount of from 10 to 25% by weight.

8. The composition as claimed in claim 6, wherein the carbon fibers are present in an amount of at most 16% by weight.

9. The composition as claimed in claim 8, wherein the carbon fibers are present in an amount of at most 12% by weight.

10. The composition as claimed in claim 6, wherein the polyamide is a nylon-4,6, -6,6, -6,12, -8,10, -10,10, -6, -10,12, -11, -12 or -12,12.

11. The composition as claimed in claim 6, wherein the composition further comprises additives selected from the group consisting of processing aids, mold-release agents, stabilizers, flame retardants, glass fibers, mineral fillers and plasticizers.

12. A method of fabricating a plastic article, comprising:
   manufacturing an article selected from the group consisting of gas station supply piping, filling nozzles, piping for gas-removal systems, quick connectors, motor fuel filter casings, piping for brake fluids, coolants or hydraulic fluid and piping for the conveyance of powder or dust by shaping a composition containing polyamide and from 3 to 30% by wt. of a conductive carbon black defined by the parameters as follows:
   a) a DBP absorption ranging from 100 to 300 ml/100 g;
   b) a specific surface area ranging from 30 to 180 m$^2$/g;
   c) an ash content of less than 0.1% by weight; and
   d) a grit content of not more than 25 ppm.

13. The method of claim 12, wherein the polyamide containing composition contains from 10 to 25% by weight of conductivity black.

14. The method of claim 13, wherein the polyamide containing composition contains from 16 to 20% by weight of conductivity black.

15. The method of claim 12, wherein the polyamide containing composition contains from 0.1 to 20% by weight of carbon fibers.

16. The method of claim 12, wherein the composition further comprises additives selected from the group consisting of processing aids, mold-release agents, stabilizers, flame retardants, glass fibers, mineral fillers and plasticizers.

17. The method of claim 12, wherein the plastic article is formed as a one-layer structure from the polyamide containing composition.

18. The method of claim 12, wherein the plastic article is formed of at least two layers, where at least one layer is made from a thermoplastic polyamide containing composition and the other layers are composed of another composition which has not been rendered antistatic.

* * * * *